Dec. 17, 1940.   I. G. GEE   2,224,907
COASTER BRAKE
Filed May 25, 1940
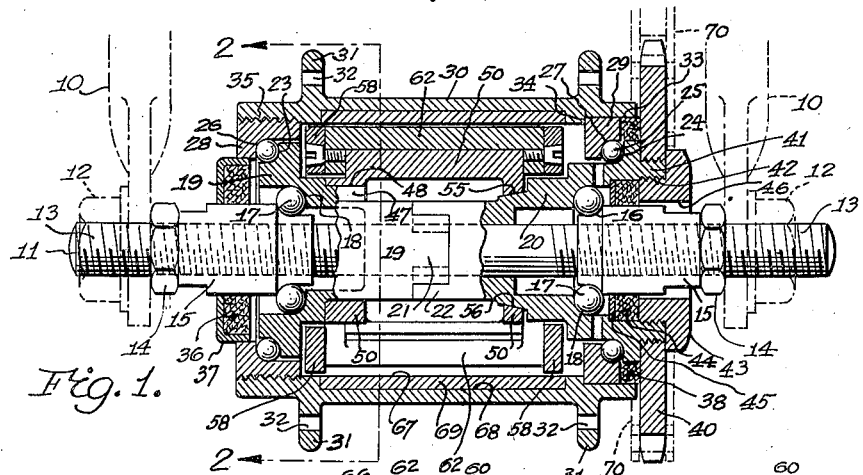
Fig. 1.
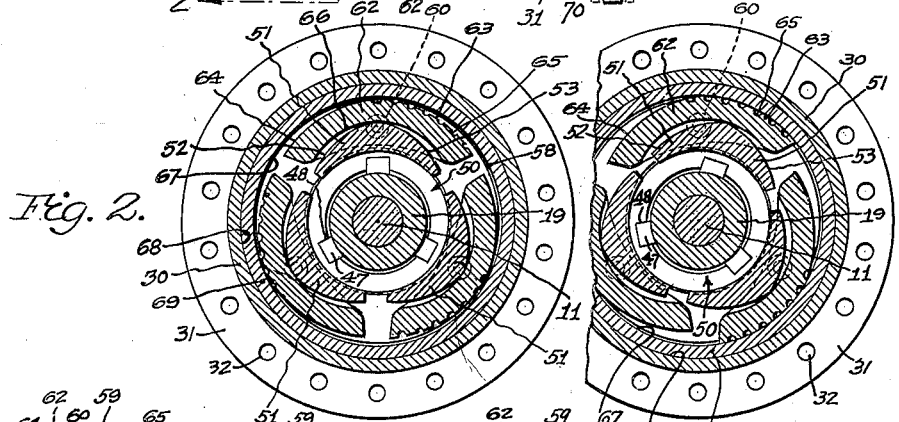
Fig. 2.   Fig. 3.
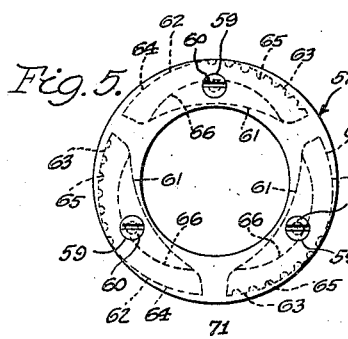
Fig. 5.   Fig. 4.
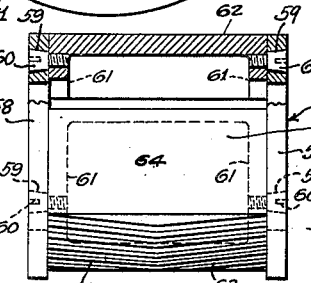
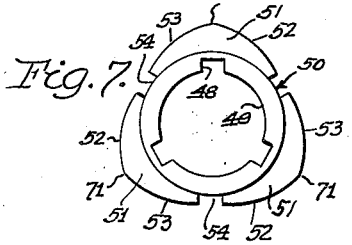
Fig. 7.   Fig. 6.
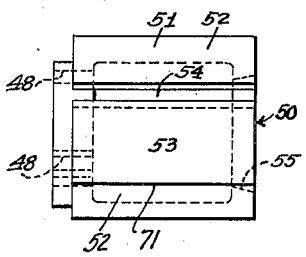
Inventor
Ira G. Gee
By
Attorneys Patented Dec. 17, 1940

2,224,907

UNITED STATES PATENT OFFICE 2,224,907

COASTER BRAKE

Ira G. Gee, Flint, Mich.

Application May 25, 1940, Serial No. 337,114

16 Claims. (Cl. 192—6)

This invention relates to vehicle brakes and in particular to coaster brakes wherein the operation of the mechanism in one direction imparts a driving action to the vehicle wheel, whereas motion in the opposite direction applies a braking action thereto and an intermediate position provides a free wheeling or coasting operation.

One object of this invention is to provide a coaster brake having brake shoes actuated by cam mechanism for applying a driving force when the cam is rotated in one direction and for applying a braking force when the cam is rotated in the opposite direction.

Another object of the invention is to provide a coaster brake wherein tiltable brake shoes are adapted to be tilted in one direction to effect a driving engagement with a reaction surface, and tiltable in the opposite direction to effect a braking engagement with the reaction surface.

Another object is to provide a coaster brake as set forth in the preceding objects wherein the brake shoe is provided on a portion of its areas with recesses or grooves for wiping off or draining off the oil so as to provide an improved driving engagement of the parts.

Another object is to provide a coaster brake having a multi-lobe cam engageable with pivoted brake shoes to tilt the shoes against a reaction surface for effecting driving engagement for one direction of rotation of the cam, the brake shoes being tiltable in the opposite direction to effect a braking engagement with the reaction surface in response to the rotation of the cam in the opposite direction from its direction of driving rotation.

In the drawing:

Figure 1 is a central horizontal section, partly broken away, through a preferred embodiment of the coaster brake of this invention.

Figure 2 is a cross section along the line 2—2 in Figure 1 showing the parts in the coasting or free wheeling position.

Figure 3 is a cross section similar to Figure 2 but showing the brake shoes tilted into driving engagement with the brake drum or reaction surface.

Figure 4 is a side elevation of the brake shoe assembly employed in the coaster brake of Figures 1 to 3 inclusive.

Figure 5 is an end elevation of the brake shoe assembly shown in Figure 4.

Figure 6 is a side elevation of a multi-lobe cam employed in the coaster brake of Figures 1 to 3 inclusive.

Figure 7 is an end elevation of the cam shown in Figure 6.

General arrangement

In general, the coaster brake of this invention consists of an axle carrying a multi-lobe cam (Figure 7) which is internally engageable with a plurality of tiltable brake shoes pivotally mounted on end rings (Figure 5). The cam is keyed to the driving cones, which in turn are connected to the driving sprocket, so that when the sprocket and cam are rotated in a forward direction, the lobes of the cams engage and tilt the brake shoes against the reaction surface of a brake drum and thereby effect a driving engagement. When, however, the cam is rotating in the reverse direction, its lobes engage the opposite ends of the brake shoes and tilt them in the opposite direction into braking engagement with the brake drum. In an intermediate position, however, where the brake shoes are tilted part way between their driving and braking positions respectively, they are free from engagement with the brake drum and accordingly a coasting or free wheeling position is provided wherein neither a braking nor a driving engagement is brought about.

The driving surface of each brake shoe is provided with recesses, such as grooves, so that the oil on the reaction surface of the brake drum is wiped off and conveyed away in order to facilitate and quicken the driving engagement as well as to prevent slippage. The brake surfaces of the brake shoes, however, are substantially plain or smooth so that the braking action takes place more gradually, and without a sudden seizure of the parts. Thus the brake drum serves both as a braking element and a driving element. The brake drum may be made of steel but it is preferred to employ a different material having enhanced braking and driving properties, and also to provide for the renewal of this drum without requiring the renewal of the adjacent parts of the hub.

Construction

Referring to the drawing in detail, Figure 1 shows diagrammatically bicycle fork members 10 arranged in the usual manner to support an axle 11 by means of nuts 12 threaded upon the threaded ends 13 thereof against abutment portions 14 formed on the threaded collars 15. The inner ends of the latter are provided with internal ball race portions 16 engaging anti-friction bearing balls 17.

The opposite surfaces of the bearing balls 17 are engaged by the external ball race portions 13 of the driving sleeves 19 and 20. The driving sleeves 19 and 20 are provided with interlocking jaw portions 21 and 22 whereby they are drivingly interconnected so as to rotate as a unit. The driving sleeves 19 and 20 are also provided with internal ball race portions 23 and 24 respectively engaging anti-friction bearing balls 25 externally engaged by the bearing race portions 26 and 27 of the retaining rings 28 and 29.

The retaining rings 28 and 29 are mounted within the hub sleeve 30 having the usual flanges 31 with apertures 32 for receiving the ends of the wheel spokes (not shown). The ring 29 is received within a bore 33 in one end of the hub sleeve 30, and abuts against the shoulder 34 therein. The ring 28, on the other hand, is externally threaded, and by this means is threaded into the threaded bore 35 at the opposite end of the hub sleeve 30.

An oil seal packing 36 enclosed within a cup 37 is mounted within the ring 28 surrounding the left hand collar 15 so as to prevent leakage of the lubricating oil out of the coaster brake. Similarly, an oil seal packing 38 is interposed between the ring 29 and the drive sprocket 40 which is internally threaded and mounted upon the threaded outer end 41 of the driving sleeve 20. The outer end of the sleeve 20 is also internally threaded as at 42 to receive a nut 43 for locking the sprocket 40 in position. An oil seal packing 44 and a washer 45 cooperate to prevent leakage of the oil from the interior of the coaster brake through the bore 46 within the nut 43.

The driving sleeve 19 is provided with a plurality of driving lugs or splines 47, three being shown. These splines or lugs 47 are disposed around the periphery of the driving sleeve 19 and engage similarly disposed slots 48 extending outwardly from the internal bore 49 of the operating cam 50.

The operating cam 50 is provided with multiple lobes 51 having oppositely disposed drive actuating and brake actuating surfaces 52 and 53 respectively. The individual lobes 51 are separated by slots 54 serving to space the lobes apart from each other. The opposite end of the cam 50 from the end containing the driving slots 48 is provided with an internal conical bore 55 (Figures 1 and 6). This coacts with an externally conical surface 56 upon the driving sleeve 20.

The cam 50 is mounted within a brake shoe assembly 57 (Figures 4 and 5) consisting of end rings 58 having spaced holes 59 adapted to receive the heads of pivot screws 60, the inner ends of which are threaded into the inwardly extending lugs 61 of the tiltable brake shoes 62. The latter are approximately in the form of segments of a hollow cylinder, and are provided with external driving surface portions 63 and braking portions 64. The driving surfaces 63 are provided with oil grooves 65 extending obliquely across the driving surfaces 63 (Figure 4) so as to perform a wiping and oil draining action. The braking surfaces 64, however, are smooth. The interior of each brake shoe is provided with an internal surface 66 adapted to be engaged by the surfaces 52 and 53 of the lobes 51 on the periphery of the cam 50.

The outer surfaces 63 and 64 of the brake shoes 62 are engageable with the annular internal surface 67 of the brake drum or brake lining 69. The latter is of annular configuration and is mounted within the internal annular recess 68 of the hub sleeve 30. The brake drum or lining 69, if a metal, may be cast in position within the annular recess 68, or, if a composition, it may be molded into place. Various brake materials may be employed for the brake lining 69.

*Operation*

In the operation of the coaster brake of this invention, let it first be assumed that the coaster brake is mounted in the rear fork of a bicycle with the sprocket 40 driven by the usual sprocket chain 70 from the large sprocket mounted on the usual hanger carrying the pedals (not shown). If the operator desires to coast, he merely rests upon his pedals in the usual manner. In this coasting position, the parts occupy the locations shown in Figure 2. In this coasting position, the tips 71 of the cam lobes 51 come to rest approximately beneath the pivot screws 60, so that the brake shoes 62 rock freely into their neutral positions (Figure 2) wherein neither of their surfaces 63 or 64 is in engagement with the reaction surface 67 of the brake lining 69.

If the operator desires now to propel the bicycle, he rotates the sprocket 50 in the forward direction by applying force to the pedals in the forward direction. This action rotates the cam 50 in the forward direction so that the tip 71 engages the inner surface 66 of each brake shoe 62 (Figure 3) and tilts the grooved surface 63 into engagement with the reaction surface 67 of the brake lining 69. As the surfaces 63 and 67 come into engagement, the oil thereon is wiped away and carried off by the grooves 65 so that a quick driving engagement is effected.

To brake the vehicle, the operator back-pedals in the usual manner, rotating the cam 50 backward so that the tips 71 of the lobes 51 engage the internal brake shoe surface 66 on the opposite sides of the pivot screws 60. This causes the parts to occupy a position opposite to that shown in Figure 3, so that the brake shoes 62 are tilted in the opposite directions around their pivot screws 60. When this occurs, the smooth surfaces 64 of the brake shoes 62 come into engagement with the reaction surface 67 of the brake lining 69, the oil film being squeezed out and a gradual braking effect applied to the brake lining 69. This braking effect is transmitted to the hub sleeve 30 and thence to the tires by way of the spokes.

Thus the invention provides a simple but sturdy coaster brake with a minimum number of parts, yet with a rapid and effective action, either for driving or for braking purposes. The greater the force which the operator applies through his pedals and sprocket chain, the greater is the driving or braking effect, as the case may be.

The coaster brake of this invention is also easily assembled and disassembled, facilitating repairs and speeding up production. The brake lining 69 may be replaced by a new brake lining when the old lining has become worn, and this replacement may be made either by recasting the brake lining metal or remolding the brake lining composition into the annular internal groove 68 within the hub sleeve 30.

While I have shown and described my invention in detail, it is to be understood that the same is to be limited only by the appended claims for many changes may be made without departing from the spirit and scope of the invention.

What I claim is:

1. In a coaster brake, a hub having a reaction portion associated therewith, a shoe supporting structure within said hub, a plurality of shoes movably mounted on said shoe supporting structure, a cam having shoe actuating portions operatively engageable with said shoes to move said shoes into engagement with said reaction portion, and means for oppositely rotating said cam to move said shoes in one direction into driving engagement with said reaction portion and in another direction into braking engagement therewith.

2. In a coaster brake, a hub having a reaction portion associated therewith, a shoe supporting structure within said hub, a plurality of shoes movably mounted on said shoe supporting structure, a cam having a plurality of projections operatively engageable with said shoes to rock said shoes into engagement with said reaction portion, and means for oppositely rotating said cam to move said shoes in one direction into driving engagement with said reaction portion and in another direction into braking engagement therewith.

3. In a coaster brake, a hub having a reaction portion associated therewith, a shoe supporting structure within said hub, a plurality of shoes movably mounted on said shoe supporting structure, a cam having a plurality of projections operatively engageable with the inner surfaces of said shoes to move said shoes into engagement with said reaction portion, and means for oppositely rotating said cam to move said shoes in one direction into driving engagement with said reaction portion and in another direction into braking engagement therewith.

4. In a coaster brake, a hub having a reaction portion associated therewith, a shoe supporting structure within said hub, a plurality of segmental shoes movably mounted within said shoe supporting structure, a cam having shoe actuating portions operatively engageable with said shoes to move said shoes into engagement with said reaction portion, and means for oppositely rotating said cam to move said shoes in one direction into driving engagement with said reaction portion and in another direction into braking engagement therewith.

5. In a coaster brake, a hub having a reaction portion associated therewith, a shoe supporting structure within said hub, a plurality of segmental shoes movably mounted within said shoe supporting structure and intermediately pivoted thereon, a cam having shoe actuating portions operatively engageable with said shoes to move said shoes into engagement with said reaction portion, and means for oppositely rotating said cam to move said shoes in one direction into driving engagement with said reaction portion and in another direction into braking engagement therewith.

6. In a coaster brake, a hub having a reaction portion associated therewith, a pair of shoe supports spacedly disposed within said hub, a plurality of shoes mounted between said shoe supports, a cam having shoe actuating portions operatively engageable with said shoes to rock said shoes into engagement with said reaction portion, and means for oppositely rotating said cam to rock said shoes in one direction into driving engagement with said reaction portion and in another direction into braking engagement therewith.

7. In a coaster brake, a hub having a reaction portion associated therewith, a pair of shoe supports spacedly disposed within said hub, a plurality of segmental shoes of approximately arcuate cross section mounted between said shoe supports, a cam having shoe actuating portions operatively engageable with said shoes to rock said shoes into engagement with said reaction portion, and means for oppositely rotating said cam to rock said shoes in one direction into driving engagement with said reaction portion and in another direction into braking engagement therewith.

8. In a coaster brake, a hub having a reaction portion associated therewith, a pair of shoe supports spacedly disposed within said hub, a plurality of segmental shoes disposed between said shoe supports and intermediately pivoted thereto, a cam having shoe actuating portions operatively engageable with said shoes to rock said shoes into engagement with said reaction portion, and means for oppositely rotating said cam to rock said shoes in one direction into driving engagement with said reaction portion and in another direction into braking engagement therewith.

9. In a coaster brake, a hub having a reaction portion associated therewith, a pair of shoe supports spacedly disposed within said hub, a plurality of segmental shoes of approximately arcuate cross section pivotally connected intermediate their ends to said shoe supports, a cam having shoe actuating portions operatively engageable with said shoes to rock said shoes into engagement with said reaction portion, and means for oppositely rotating said cam to rock said shoes in one direction into driving engagement with said reaction portion and in another direction into brakng engagement therewith.

10. In a coaster brake, a hub having a reaction portion associated therewith, a pair of shoe supports spacedly disposed within said hub, a plurality of segmental shoes pivotally mounted between said supports at points intermediate the opposite edges of said shoes, a cam having shoe actuating portions operatively engageable with the inner surfaces of said shoes to rock said shoes into engagement with said reaction portion, and means for oppositely rotating said cam to rock said shoes in one direction into driving engagement with said reaction portion and in the opposite direction into braking engagement therewith.

11. In a coaster brake, a hub having a reaction portion associated therewith, a pair of shoe supports spacedly disposed within said hub, a plurality of segmental shoes pivotally mounted between said supports at points intermediate the opposite edges of said shoes, a cam having a plurality of lobes disposed adjacent the inner surfaces of said shoes and operatively engageable therewith to rock said shoes into engagement with said reaction portion, and means for operatively rotating said cam to rock said shoes in one direction into driving engagement with said reaction portion and in the opposite direction into braking engagement therewith.

12. In a coaster brake, a hub having a reaction portion associated therewith, a pair of shoe supports spacedly disposed within said hub, a plurality of segmental shoes pivotally mounted between said supports at points intermediate the opposite edges of said shoes, a cam having shoe actuating portions operatively engageable with the inner surfaces of said shoes to rock said shoes into engagement with said reaction portion, a sprocket drivingly connected to said cam, and means for oppositely rotating said sprocket to rock said shoes in one direction into driving engagement with said reaction portion and in the opposite direction into braking engagement therewith.

13. In a coaster brake, a hub having an internal reaction portion, a shoe supporting structure within said hub and having spaced pivot portions associated therewith, an assembly of segmental shoes intermediately pivoted to said pivot portions and disposed therebetween, a cam having shoe actuating portions disposed within said shoe assembly and engageable with the inner surfaces of said shoes to rock said shoes, a hollow shaft disposed within said cam and drivingly connected thereto, and means for oppositely rotating said shaft and cam to rock said shoes in one direction into driving engagement with said reaction portion and in another direction into braking engagement therewith.

14. In a coaster brake, a hub having an internal reaction portion, a shoe supporting structure within said hub and having spaced pivot portions associated therewith, an assembly of segmental shoes intermediately pivoted to said pivot portions and disposed therebetween, a cam having shoe actuating portions disposed within said shoe assembly and engageable with the inner surfaces of said shoes to rock said shoes, a hollow shaft disposed within said cam and drivingly connected thereto, and means for oppositely rotating said shaft and cam to rock said shoes in one direction into driving engagement with said reaction portion and in another direction into braking engagement therewith, said hollow shaft comprising a plurality of separable components having interlocking parts at their meeting portions.

15. In a coaster brake, a hub having a reaction portion associated therewith, a shoe supporting structure within said hub, a plurality of shoes movably mounted on said shoe supporting structure, a cam having shoe actuating portions operatively engageable with said shoes to move said shoes into engagement with said reaction portion, and means for oppositely rotating said cam to move said shoes in one direction into driving engagement with said reaction portion and in another direction into braking engagement therewith, said shoes having transverse oil recesses in at least part of their surfaces engaging said hub reaction portion.

16. In a coaster brake, a hub having an internal reaction portion, a shoe supporting structure within said hub and having spaced pivot portions associated therewith, an assembly of segmental shoes intermediately pivoted to said pivot portions and disposed therebetween, a cam having shoe actuating portions disposed within said shoe assembly and engageable with the inner surfaces of said shoes to rock said shoes, and means for oppositely rotating said cam to rock said shoes in one direction into driving engagement with said reaction portion and in another direction into braking engagement therewith, said shoes having transverse oil recesses in at least part of their surfaces engaging said hub reaction portion.

IRA G. GEE.